Patented July 4, 1933

1,916,604

UNITED STATES PATENT OFFICE

THOMAS S. CARSWELL AND WILLIAM GUMP, OF ST. LOUIS, MISSOURI, ASSIGNORS, BY MESNE ASSIGNMENTS, TO MONSANTO CHEMICAL COMPANY, A CORPORATION OF DELAWARE

N-SUBSTITUTED ARYL-SULPHONAMIDES AND PROCESS OF PRODUCING SAME

No Drawing.   Application filed January 16, 1929.   Serial No. 333,016.

This invention relates to novel N-substituted aryl sulphonamide and a process for producing same.

The new compounds contemplated by this invention are the aryl sulphonyl derivatives of acetylated amines; these have been found to possess properties suited to their use in the manufacture of cellulose plastic compositions. An example of a chemical compound falling within the scope of our invention is N-ethyl-N-acetyl paratoluene sulphonamide which may be represented structurally as follows:

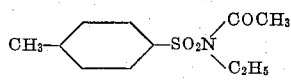

Such chemical compounds may be prepared or produced easily by causing an appropriate acetylating agent, such as acetic anhydride or acetyl chloride to act upon an aryl sulphonamide in which one of the free hydrogen atoms directly attached to the nitrogen has been replaced by a hydrocarbon residue. The reaction takes place according to the equations:

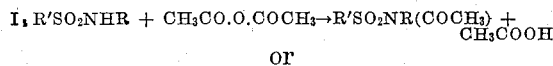

or

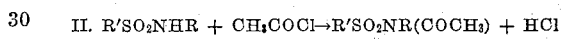

In these equations, R′ represents the aryl nucleus of the substituted sulphonamide, and R represents the alkyl group which has been substituted for one of the hydrogen atoms directly attached to the nitrogen of the sulphonamide.

In order to more clearly explain our invention, we will describe a procedure that may be used for producing a chemical compound contemplated by our invention and consisting of N-ethyl-N-acetyl paratoluene sulphonamide.

156 grams of N-ethyl paratoluene sulphonamide are dissolved in 300 grams of acetic acid, and 94 grams of acetic anhydride is added. 1 gram of sulphuric acid is then added, and the mixture is refluxed for 4 hours. At the end of this time, the reaction mixture is poured out into one liter of water, when the acetyl derivative is precipitated out. After re-crystallization from alcohol, the product, N-ethyl-N-acetyl paratoluene sulphonamide, is obtained as white crystals with a crystallizing point of 52.5°.

Chemical compounds of the kind above described are easy to produce or obtain, and when used in conjunction with cellulose ester or cellulose ether and a suitable solvent, will produce a cellulose composition that has great flexibility, that will not become brittle, that will not deteriorate upon aging or when subjected to a relatively high temperature, and which is very stable to light.

Having thus described our invention, what we claim and desire to secure by Letters Patent is:

1. A process consisting in causing an acetylating agent to act upon an aryl sulphonamide in which the aryl group is an aromatic hydrocarbon radical and in which one of the hydrogen atoms attached to the nitrogen atom has been substituted by an aliphatic hydrocarbon radical.

2. A process consisting in causing acetic anhydride to act upon an aryl sulphonamide in which the aryl group is an aromatic hydrocarbon radical and in which one of the hydrogen atoms attached to the nitrogen atom has been substituted by an aliphatic hydrocarbon radical.

3. A process for producing an N-ethyl-N-acetyl toluene sulphonamide which consists in causing an acetylating agent to act upon the corresponding N-ethyl toluene sulphonamide.

4. A process for producing an N-ethyl-N-acetyl aryl sulphonamide which consists in causing an acetylating agent to act upon the corresponding N-ethyl aromatic sulphonamide in which the aromatic radical is a hydrocarbon radical.

5. The method as defined in claim 4 and further characterized in that the acetylating agent is acetic anhydride.

6. The method as defined in claim 4 and further characterized in that the acetylating agent is acetyl chloride.

7. A composition of matter having the structural formula:

where R is an aromatic hydrocarbon radical; X is an alkyl radical and Y an acetyl radical.

THOMAS S. CARSWELL.
WILLIAM GUMP.